United States Patent Office 3,700,437
Patented Oct. 24, 1972

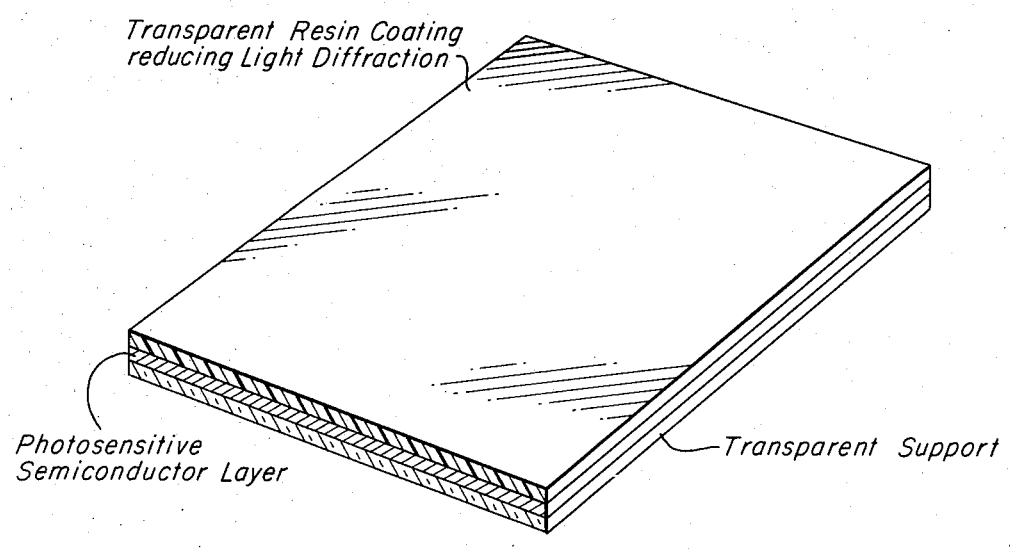

3,700,437
TRANSPARENT IMAGING MEDIUM
William E. Eastler, Jr., Woburn, Mass., assignor to Itek Corporation, Lexington, Mass.
Continuation-in-part of application Ser. No. 708,630, Feb. 27, 1968. This application Dec. 21, 1970, Ser. No. 76,279
Int. Cl. B44d 1/16; G03g 5/08
U.S. Cl. 96—1.8
13 Claims

ABSTRACT OF THE DISCLOSURE

A photographic imaging medium comprising a transparent support, a pellucid film of a particulate photosensitive semi-conductor thereon preferably having a thickness of about ½ mil or less, and a transparent film over said pellucid film to decrease light diffraction thereby. The semiconductor preferably has an average particle size of about 300 m$\mu$ or less in diameter and preferably is present on the imaging medium in an amount per unit area of about 3 grams per square meter (g./m.$^2$) or less. Method of decreasing the diffraction of light at the surface of an imaging medium comprising a transparent support and a pellucid film of a particulate semiconductor thereon by providing said pellucid film on semiconductor with a transparent coating.

CROSS REFERENCES TO RELATED APPLICATIONS

This application is a continuation-in-part of application Ser. No. 708,630, filed Feb. 27, 1968, now abandoned.

BACKGROUND OF THE INVENTION

(1) Field of the invention

The present invention relates to methods for reducing light diffraction in a pellucid photographic imaging medium and to improved pellucid imaging media exhibiting reduced light diffraction.

(2) Description of the prior art

Commonly-owned copending patent application Ser. No. 199,211, filed May 14, 1962, now abandoned, discloses photographic imaging media comprising a photosensitive semiconductor and a support therefor. The supports taught in the copending application may be flexible or inflexible, transparent or opaque, made of natural or synthetic materials such as wood, cardboard, paper glass, metal, and plastic. The photosensitive material may be supported on the substrate as a layer, with or without an accompanying binder, or may be dispersed throughout the support, as in the case where particles of the photosensitive agent are incorporated with the web of a material such as paper or cardboard or are held within a plastic.

The photosensitive semiconductors described in the copending application, which materials are also photoconductors, are principally compounds formed between metals and elements of Group VI of the Periodic Table, namely metal oxides, sulfides, selenides, and tellurides.

Imaging media including similar photosensitive materials are taught in U.S. 3,052,539 for use in electrostatic image forming processes.

Imaging media of particular interest, because they can be used to prepare positive or negative photographic transparencies, are those prepared by supporting a photosensitive material on a transparent base. To prepare such imaging media, finely-divided particles of a photoconductor are conveniently dispersed in a binder and applied as a thin film to a transparent substrate.

The photoconductors of interest are commonly materials of relatively high refractive index. Indeed, titanium dioxide, which is a material of particular interest, has the highest index of refraction of any known substance. As a result, light is strongly diffracted at the surface of the light-sensitive film on the transparent support. This tends to increase the opacity of the resulting media, rendering them less suitable for the preparation of transparencies.

SUMMARY OF THE INVENTION

It has now been found according to the present invention that diffraction of light at the surfaces of such an imaging medium can be significantly reduced by coating the photosensitive layer with a transparent coating such as a resinous material. The difference between the refractive index of the coating and that of the photosensitive semiconductor should be less than the difference between the refractive indices of the photo-sensitive semiconductor and the viewing atmosphere, e.g. air. The smaller the difference between the indices of refraction of the semiconductor compound and the coating for said semiconductor compound, the greater is the transparency of the coated medium. The difference between the indices of refraction of the semiconductor compound and the coating should preferably not be more than about 1.0 unit and more preferably not more than about 0.5 unit. In this invention it is important to obtain a sufficiently transparent copy medium to get out the desired information so that one does not inhibit the retrieval of low density information from a light transmission viewer in which the image is projected onto a screen from a transmitted light source. Low density information is that information having a density of .03–.05 density unit above base plus fog. Therefore, preferably the semiconductor has an average particle size of about 300 m$\mu$ or less in diameter, preferably the semiconductor is present on the imaging medium in an amount per unit area of about 3 grams per square meter or less, the semiconductor layer preferably has a thickness of about ½ mil or less and more preferably about 2 microns or less, and the photoconductor preferably is properly dispersed in the binder material, as for example by means of a sonic blender.

DESCRIPTION OF THE DRAWING

The figure of the accompanying drawing is a perspective view of an imaging medium of the present invention comprising a transparent support, a photosensitive semiconductor layer, and a transparent resin coating reducing light diffraction.

DESCRIPTION OF PREFERRED EMBODIMENT

As transparent substrate materials suitable for use in preparing the imaging media of the present invention, support layers of materials such as cellulose acetate, polystyrene, polyacetates, polyesters, glass, or glassine-type papers made from highly beaten wood pulps may be employed.

The photosensitive semiconductors or photoconductors preferred in this invention are metal containing photoconductors. A preferred group of such photosensitive materials are inorganic materials such as the compounds of a metal and a non-metallic element of Group VI-A of the Periodic Table, e.g. oxides such as zinc oxide, titanium dioxide, zirconium dioxide, germanium dioxide, and indium trioxide; metal sulfides such as cadmium sulfide (CdS), zinc sulfide (ZnS), and tin disulfide (SnS$_2$); and metal selenides such as cadmium selenide (CdSe). Metal oxides are preferred photoconductors of this group, and titanium dioxide is a preferred metal oxide because of its sensitivity, availability, and color. Titanium dioxide which has an average particle size less than about 250 millimicrons is preferred. Especially preferred also is titanium dioxide which has been treated in an oxidizing atmosphere at a temperature between about 200° C. and 950° C. for from about 0.5 hour to about 30 hours, and more especially that titanium dioxide produced by high temperature pyrolysis of a titanium halide.

Imaging media made with titanium dioxide are particularly amenable to improvement according to the present invention in view of the high index of refraction [1] (2.5) of the material when compared, for example, with that of air (1.0) because of the particulate and opaque appearance of the photoconductor in the photosensitive layer, the latter is usually not absolutely clear. This layer is characterized herein as being "pellucid" to suggest a character intermediate to absolute transparency and translucency. Generally the refractive index of the coating for the semiconductor of this invention will be between that of air and that of the photosensitive semiconductor due to the high indices of refraction of the photosensitive semiconductors.

The photoconductors present in the imaging media of this invention may be sensitized to visible and other wavelengths of light by foreign ion doping, addition of fluorescent materials, and/or by means of sensitizing dyes. Bleachable dyes useful for sensitizing the photoconductors of this invention include, for example, the cyanine dyes, the dicarbocyanine dyes, the carbocyanine dyes, and the hemicyanine dyes. Additional dyes which are useful for sensitizing the photosensitive medium of this invention are the cyanine dyes described on pp. 371–429 in "The Theory of Photographic Process," by C. E. Kenneth Mees, published by McMillan Company in 1952. Other useful dyes include those known to the art as triphenylmethane dyes, such as crystal violet and basic Fuchsin, diphenylmethane dyes such as Auroamine O, and Xanthene dyes such as Rhodamine B.

The photoconductors are usually dispersed as finely-divided particles in a binder which is preferably chosen to have a high index of refraction approaching that of the particles dispersed therein. Gelatin, the commercially available "Rhoplex" acrylates, acid-soluble acrylics, and styrene-butadiene resins have all been employed in the art as binder materials. In these coatings the pigment to binder ratio may be between 1:4 and 16:1 and is preferably between 2:1 and 12:1. In coatings containing a given weight of pigment, optimum transparency is observed, surprisingly, when the pigment:binder ratio is about 6:1. The addition of further binder, although "diluting" the pigment in the coating, increases the opacity of the coating. The particle size of the photosensitive semiconductor is preferably about 300 millimicrons or less in average diameter since films made using this particle size have much improved transparency.

In a still further embodiment of the invention, the photosensitive semiconductor may be treated prior to exposure to imaging radiation with an agent forming an image on exposure. For example, a photosensitive material such as titanium dioxide may be treated with reducible metal ions prior to imaging exposure. On exposure a latent or visible image is formed, depending on exposure conditions and the substances employed. Latent images may be intensified to make them visible, for example by techniques analogous to physical development, as mentioned hereinbefore.

Imaging media comprising a supported photoconductor layer of this type may be developed after exposure to imaging radiation by contact with image-forming agents which, for example, react chemically at the light-sensitized semi-conductor surfaces to form materials defining an image. As taught in copending application Ser. No. 199,211, now abandoned, typical image-forming agents are commonly easily reducible substances such as metal ions. In the case of reducible metal ions, the ions react to form free metal at activated semiconductor sites to define the image. The images may suitably be intensified using techniques analogous to physical development.

Alternatively, if the imaging media of the present invention are used in electrostatic image-forming processes like those taught in U.S. 3,052,539, electrostatically responsive powders which conform to an electrostatic charge pattern on the media to define an image can be used for development. Prints of this type are commonly fixed by fusing the powders to the substrate on which they are supported.

The transparent resinous coatings which are applied according to the present invention to the photosensitive layer of an imaging medium may be applied to the medium before or after its exposure and development. If the transparent coatings are applied before chemical development, however, a transparent coating material must be chosen which will be permeable to the image-forming developing agents employed. The latter are generally aqueous, but not exclusively so.

The transparent overcoatings applied to the underlying photosensitive layer are substantially transparent film forming materials and include organic and inorganic coatings such as synthetic or natural film-forming materials and include synthetic resins such as butadienestyrene copolymers, e.g. those available commercially under the trade name "Pliolite"; film-forming polyacrylate resins such as those sold under the trade name "Tamol"; and natural materials such as gelatin. Metal oxides such as titanium dioxide may be deposited as transparent films by vacuum deposition techniques and the like. The thickness of the transparent coating is not of significance to the present invention providing, however, that the coating is permeable to chemical developing agents if the coating is applied to a photosensitive layer prior to exposure and development. To obtain maximum transparency with a given coating the thickness of the coating should be sufficient to completely cover any photosensitive semiconductor particles and to thereby form a smooth surface on the copy medium. The formation of a substantially smooth surface is important to obtain maximum transparency according to this invention. These overcoatings are not photosensitive per se. They comprise photochemically inert materials which are retained on, or are applied to, an image-bearing print, and are generally not temporary coatings removed during developing or fixing operations. Preferably the refraction index of these coatings is very close or the same as that of photosensitive semiconductors. For example, the top coating for a titanium dioxide layer, the titanium dioxide having a refractive index of about 2.5, preferably has a refractive index of from about 1. 5 to 2.5.

The photosensitive semiconductor layer of this invention may be a separate layer apart from the transparent support. For example, the photosensitive semiconductor may be incorporated in a resinous binder. On the other hand, the photosensitive semiconductor particles may be incorporated in the transparent support or may be deposited on the surface of such support.

A better understanding of the present invention and of its many advantages will be had by referring to the accompanying drawing, and to the following specific example given by way of illustration.

EXAMPLE

The accompanying drawing shows a typical pellucid imaging medium prepared according to the present invention comprising a transparent support layer of clear cellulose triacetate 4 to 6 mils thick, subbed with resin or gelatin, and having a light transmission of 100 foot candles.

This support is subsequently roll-coated with a light-sensitive layer comprising an aqueous mixture of a photoconductor and binder containing 6 percent of solids and

---

[1] Determined by means of sodium light (5893 angstroms).

having a pigment/binder ratio of 6:1. The pigment is a commercially available titanium dioxide having a mean diameter of 0.03 micron. The binder comprises a mixture of 1 part of lime bone, low bloom, low viscosity, subbing type gelatin with 3 parts of lime bone, high bloom inert photographic-type gelatin. The layer applied has a thickness of about 0.1 mil, corresponding to about 2 pounds/ 3000 square feet. Additives which may optionally be present in the light-sensitive layer include wetting agents and dispersants which aid in preventing agglomeration of the photoconductor particles, thus improving transparency of the coating.

The top coat, which has a thickness of less than 0.1 mil, is lime bone inert gelatin deposited from a 1.5–2.5 percent aqueous solution.

The finished medium can be exposed to light and developed by contact with aqueous silver nitrate.

Imaging media prepared as in this example but without a top coat generally have a transmission between 40 and 75 foot candles, compared with 100 for the uncoated support material. By the application of a film-forming material, e.g. a polyacrylate resin such as the "Tamol" commercial resin earlier mentioned, the transmission of the film can be brought back up to about 90 foot candles. Although the transparency attainable with gelatin is not quite as high, gelatin is a preferred material because of its permeability to aqueous solutions used to develop the media.

The transparency of the media can also be increased by decreasing the quantity of particulate semiconductor present, but this in turn decreases the sensitivity of the media and the image densities attainable therewith.

I claim the following:

1. A transparent photographic film comprising: (1) a transparent substrate, (2) a thin pellucid film thereon comprising a particulate photoconductor selected from the group consisting of zinc oxide and titanium dioxide, and wherein the photoconductor has an average particle size of about 300 m$\mu$ or less in diameter and (3) a transparent coating over said pellucid film; the transparent coating having a refractive index such that the difference between the refractive indices of the coating and that of the photoconductor is less than the difference between the indices of refraction of the viewing atmosphere and that of the photoconductor.

2. A medium as in claim 1 wherein the transparent coating is solvent permeable.

3. A medium as in claim 1 wherein the transparent coating is permeable to an image forming developing agent comprising an aqueous solution of metal ions.

4. A medium as in claim 1 wherein said photoconductor is zinc oxide.

5. A medium as in claim 1 wherein said photoconductor is titanium dioxide.

6. A medium as in claim 1 wherein said particulate photoconductor is dispersed in a binder.

7. A medium as in claim 6 wherein the ratio of photoconductor to binder by weight is about 6:1.

8. A medium as in claim 1 wherein the index of refraction of said transparent coating has a value such that the difference between the indices of refraction of the coating and that of the photoconductor is less than about 1.0 unit.

9. A medium as in claim 1 wherein said photoconductor is titanium dioxide present as a pellucid film on a resinous support.

10. A medium as in claim 8 wherein said pellucid film has a thickness of about ½ mil or less and wherein the photoconductor is present in an amount of about 3 grams per square meter or less.

11. The method of decreasing diffraction at the surface of a photographic imaging medium, which method comprises roll coating onto a transparent substrate, a pellucid film comprising a particulate photoconductor selected from the group consisting of zinc oxide and titanium dioxide, and wherein the particle size of the photoconductor is about 300 m$\mu$ or less and coating said pellucid film with a transparent coating having an index of refraction such that the difference between the refractive indices of the coating and that of the photoconductor is less than the difference between the indices of refraction of the viewing atmosphere and that of the photoconductor.

12. The method of decreasing diffraction at the surface of a photographic imaging medium which comprises roll coating a transparent substrate with a thin pellucid film of a particulate titanium dioxide wherein the titanium dioxide has a particle size of about 300 m$\mu$ or less, and coating the pellucid film of titanium dioxide with a transparent coating having an index of refraction close to or the same as that of the titanium dioxide.

13. The method as in claim 11 wherein the pellucid film has a thickness of about 0.1 mil or less and wherein the index of refraction of the coating is from about 1.5 to 2.5.

References Cited

UNITED STATES PATENTS

| | | | |
|---|---|---|---|
| 2,490,263 | 12/1949 | Gaiser et al. | 117—33.3 |
| 3,380,823 | 4/1968 | Gold | 96—1.5 |
| 3,453,141 | 7/1969 | Anolick et al. | 117—215 |

FOREIGN PATENTS

| | | |
|---|---|---|
| 1,043,250 | 9/1966 | Great Britain. |

OTHER REFERENCES

Handbook of Chemistry and Physics, 42nd ed., Cleveland, Chemical Rubber Publishing Co., 1961, pp. 594, 676, 684, 2933, 2944.

ALFRED L. LEAVITT, Primary Examiner

C. K. WEIFFENBACH, Assistant Examiner

U.S. Cl. X.R.

96—1.5; 117—111 R, 211, 215, 218, 221